United States Patent
Chen et al.

(10) Patent No.: US 7,206,310 B1
(45) Date of Patent: Apr. 17, 2007

(54) METHOD AND APPARATUS FOR REPLICATING PACKET DATA WITH A NETWORK ELEMENT

(75) Inventors: Edmund G. Chen, Sunnyvale, CA (US); Ranjit Rozario, San Jose, CA (US); Ravikrishna Cherukuri, Pleasanton, CA (US)

(73) Assignee: Redback Networks Inc., San Jose, CA (US)

( * ) Notice: Subject to any disclaimer, the term of this patent is extended or adjusted under 35 U.S.C. 154(b) by 976 days.

(21) Appl. No.: 10/032,729

(22) Filed: Dec. 28, 2001

(51) Int. Cl.
*H04L 12/56* (2006.01)
*H04L 12/54* (2006.01)

(52) U.S. Cl. ............... 370/389; 370/428; 711/100
(58) Field of Classification Search ............... 370/347, 370/352, 363, 367, 368, 371, 378, 379, 381, 370/389, 390, 395.3, 412, 428, 429; 708/232, 708/273; 709/230, 236, 238, 243, 250; 710/310
See application file for complete search history.

(56) References Cited

U.S. PATENT DOCUMENTS

| | | | | |
|---|---|---|---|---|
| 4,809,269 A | * | 2/1989 | Gulick | 370/462 |
| 5,903,544 A | * | 5/1999 | Sakamoto et al. | 370/218 |
| 6,269,081 B1 | * | 7/2001 | Chow et al. | 370/241 |
| 6,658,014 B1 | * | 12/2003 | Tezuka | 370/412 |
| 2002/0154634 A1 | * | 10/2002 | Basso et al. | 370/390 |
| 2003/0043803 A1 | * | 3/2003 | Hooper | 370/390 |
| 2004/0170176 A1 | * | 9/2004 | Kadambi et al. | 370/392 |

OTHER PUBLICATIONS

Song, You and Penno Reinaldo; IP multicasting and broadcasting extension for PPPoE Protocol draft-song-pppoe-ext-multicast-00.txt; Aug. 2001; Network Working Group Internet -Draft Expires Feb. 2002; http://www.ietf.org/itnernet-drafts/draft-song-pppoe-ext-multicast-00.txt; downloaded Jan. 3, 2002.

* cited by examiner

*Primary Examiner*—Hassan Kizou
*Assistant Examiner*—Gregory Sefcheck
(74) *Attorney, Agent, or Firm*—Blakely, Sokoloff, Taylor & Zafman, LLP

(57) ABSTRACT

A method and apparatus for replicating packet data within a network element are described herein. In one embodiment, a method includes storing packet data within a storage element, maintaining a transmit count value of the storage element, determining a release count value of the storage element, comparing the transmit count value and the release count value, and de-allocating the storage element in response to comparing the transmit count value and the release count value.

11 Claims, 8 Drawing Sheets

METHOD AND APPARATUS FOR REPLICATING PACKET DATA WITH A NETWORK ELEMENT

FIELD OF THE INVENTION

The invention relates generally to the field of communications. More specifically, the invention relates to a method and apparatus for replicating packet data within a network element.

BACKGROUND OF THE INVENTION

Conventional communications networks transmit data utilizing one or more network elements (e.g., routers, switches, gateways, repeaters, hosts, etc.). A conventional network element receives data, stores a copy of the data internally, and then transmits (e.g., routes or forwards) the stored copy of the data on its way to one or more destinations. In many instances, multiple copies of received data are generated and maintained within a network element in a process known as replication.

In such conventional network elements, replication may occur for a variety of reasons, for example, a copy of received data may be retained to be analyzed or "snooped" to obtain information about received data, other network elements, paths or "routes", etc., or to be "broadcast" or "multicast" on its way to multiple final destinations. A "broadcast" is a transmission to all network elements of a given communications network while a "multicast" is a transmission to a subset of network elements within one or more communications networks.

In a conventional network element, a unique copy of received data (e.g., packet data) is generated and stored each time the data is replicated. One disadvantage of this technique is that it requires (and wastes) a significant amount of network element storage capacity (e.g., memory) and internal bandwidth, resulting in increased network element size, cost, and power consumption, and decreased network element speed as the number and density of communications networks and the use of more time and resource-dependent applications such as video-conferencing, voice over Internet Protocol (VoIP), video feeds, gaming services, etc., increases.

SUMMARY OF THE INVENTION

A method and apparatus for replicating packet data within a network element are described herein. In one embodiment, a method includes storing packet data within a storage element, maintaining a transmit count value of the storage element, determining a release count value of the storage element, comparing the transmit count value and the release count value, and de-allocating the storage element in response to comparing the transmit count value and the release count value.

BRIEF DESCRIPTION OF THE DRAWINGS

The present invention is illustrated by way of example and not limitation in the figures of the accompanying drawings in which similar references are utilized to indicate similar elements and in which.

DETAILED DESCRIPTION

A method and apparatus for replicating packet data within a network element are described herein. In the following detailed description, numerous specific details such as specific communications network, network element, and packet processing module elements, structures, architectures, and configurations have been set forth in order to provide a more thorough understanding of the present invention. It should be evident however, that these and other specific details described need not be utilized to practice the present invention. In other circumstances, well-known structures, elements, operations, or connections have been omitted, or have not been described in particular detail in order to avoid unnecessarily obscuring the present invention.

Figure 1:
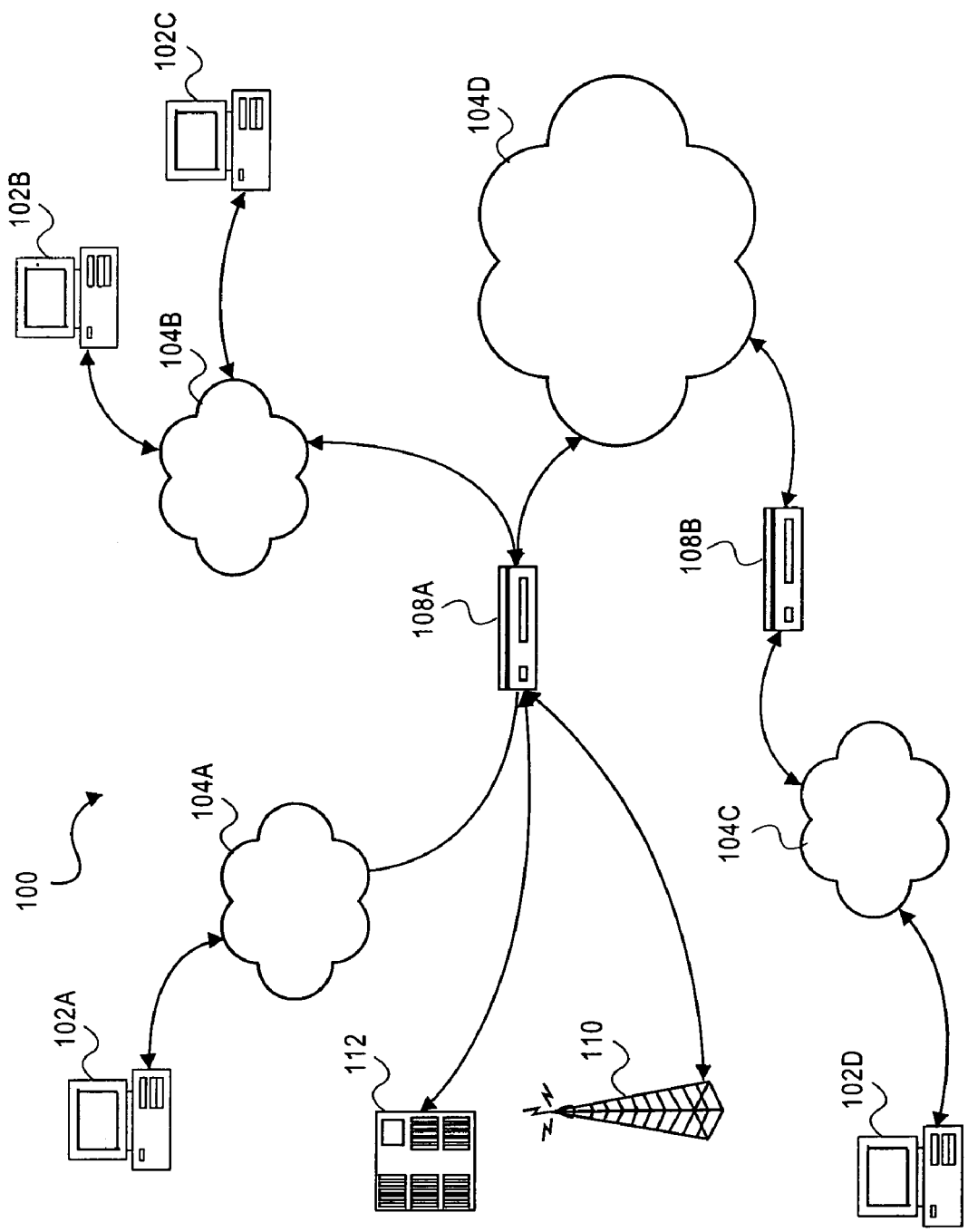
FIG. 1 illustrates a communications network according to one embodiment of the present invention.

FIG. 1 illustrates a communications network according to one embodiment of the present invention. The communications network 100 of the illustrated embodiment includes a plurality of networks elements communicatively coupled together via a plurality of communications sub-networks. More specifically, network elements may include, but are not limited to, hosts 102a–d, routers 108a–b, and customer premises equipment (CPE) (not illustrated) coupled to communications network 100 via personal business exchange (PBX) device 112, wireless network 110, or other similar coupling mechanism, as illustrated.

While specific, exemplary network elements have been depicted, any network element which may be communicatively coupled to transmit and/or receive data via at least a portion of communications network 100 may be utilized with embodiments of the present invention. Moreover, specifically-described network elements such as a hosts 102a–d or routers 108a–b may comprise a wide variety of dedicated or general-purpose data processing systems or devices including but not limited to workstations, personal computers, "thin clients" (i.e. network computers or NetPCs), Internet appliances, terminals, "thin servers" (sometimes called appliance servers, application servers, or specialty servers), palmtop computing devices, robust cellular or Personal Communications Services (PCS) telephones, gateways, switches, hubs, or the like.

Hosts 102a–d may also be coupled to communications network 100 via a number of techniques. For example, each of the illustrated hosts 102a–d may be coupled to communications network 100 via a cable modem and hybrid-fiber-cable (HFC) network, a digital subscriber line (DSL) modem and Digital Subscriber Line Access Multiplexer (DSLAM), a dial-up modem, a direct/wired or wireless network interface card connection, or any other suitable network connection mechanism.

Similarly, the embodiments of the present invention are not intended to be limited to a particular network size or topology, to a particular number of network elements, or to any particular transmission standard, protocol, or technique. In various alternative embodiments of the present invention, communications sub-networks 104a–c and 106 may comprise local-area (LAN), metropolitan-area (MAN), or wide-area (WAN) networks, may utilize circuit-switched or packet-switched technology or a combination thereof, and may implement any number of one or more network standards or protocols, (e.g., Synchronous Optical Network (SONET), Synchronous Digital Hierarchy (SDH), Asynchronous Transfer Mode (ATM), Frame Relay, Ethernet, Fast Ethernet, Gigabit Ethernet, OC-48/STM-16, OC-12/STM-14, OC-3/STM-1, IF Video, time division multiplexing (TDM), wave division multiplexing (WDM), pulse code modulation (PCM), T1, T3, DS-1, DS-3, E-1, and/or E-3.)

In one embodiment, communications sub-networks 104a–c each comprise metropolitan area or local area networks and communications sub-network 106 comprises a wide-area network such as a long-haul network, Internet backbone, or "core" network. Host 102a creates and transmits an Internet Protocol (IP) multicast message including one or more IP multicast packets to be transmitted to hosts 102b–d via communications network 100. As an IP multicast packet is being transmitted, it arrives at router 108a and is replicated for re-transmission on a plurality of router 108a's output interfaces to hosts 102b–d according to an embodiment of the present invention.

Figure 2:
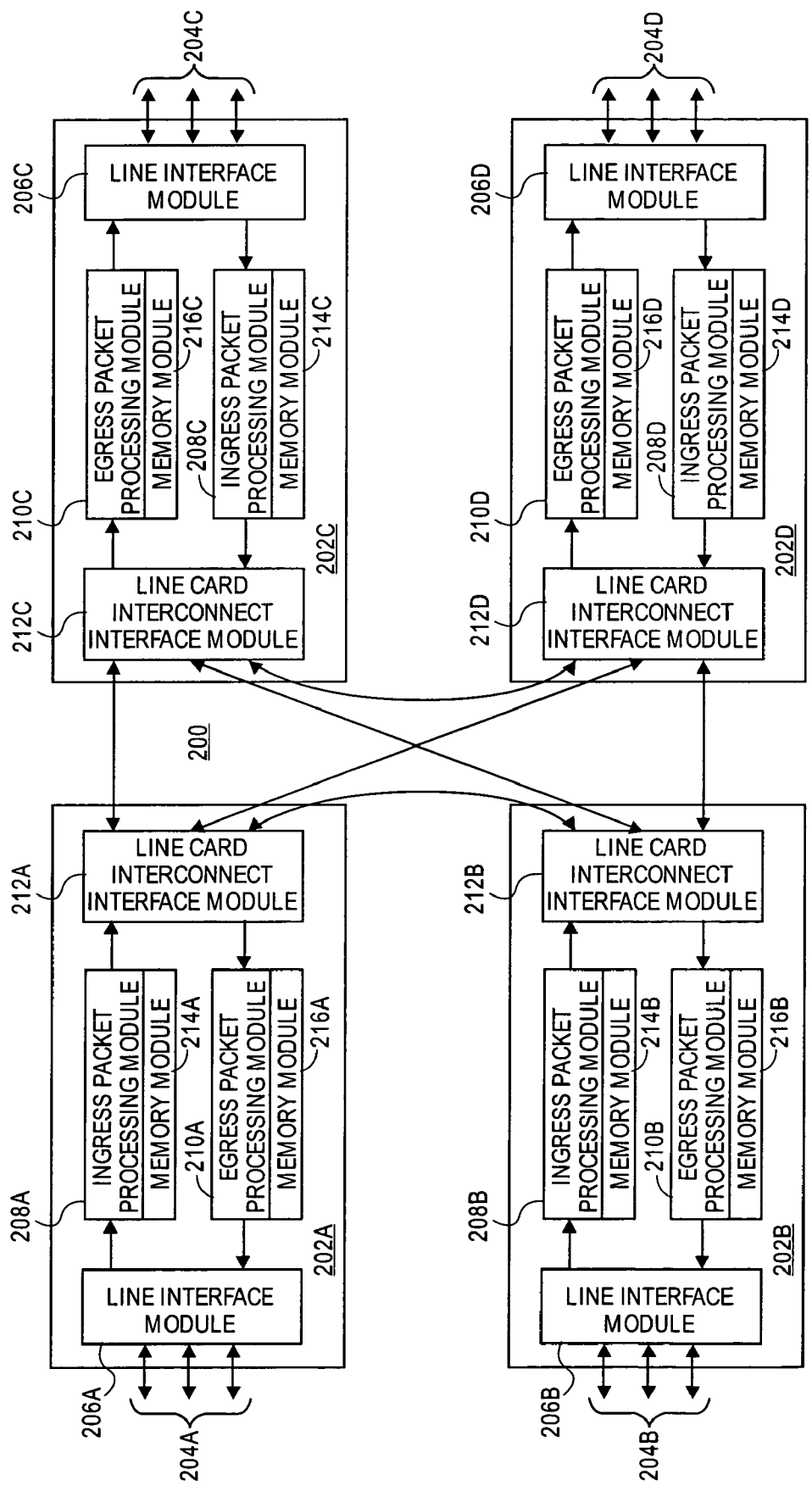
FIG. 2 illustrates a block diagram of a portion of a network element according to one embodiment of the present invention.

FIG. 2 illustrates a block diagram of a portion of a network element according to one embodiment of the present invention. FIG. 2 may illustrate, for example, an exemplary router 108a network element according to one embodiment of the present invention. The illustrated network element embodiment includes a plurality of line cards 202a–d communicatively coupled to one another via a line card interconnect 200 or "backplane". In one embodiment, line card interconnect 200 comprises a packet mesh via which each of the line cards 202a–d are coupled to one another. In other embodiments of the present invention, alternative switch fabric interconnection techniques may be implemented such as a control card, coupled to each of the line cards 202a–d, providing for switching therein.

In the illustrative example of FIG. 2, each line card 202a–d includes a line interface module 206a–d, an ingress packet processing module 208a–d and an egress packet processing module 210a–d each with its own associated memory module, 214a–d and 216a–d, respectively, and a line card interconnect interface module 212a–d, respectively, coupled together as shown. A memory module may include any suitable data storage module or device including cache, random access (RAM) or read-only memory (ROM), or the like. Each line interface module 206a–d includes one or more line interfaces 204a–d, respectively, which are utilized to couple each line card 202a–d, and the network element itself, to a communications network such as communications network 100 of FIG. 1, or a communications sub-network thereof. Each line interface 204a–d may be configured to couple an associated line card to an optical or electrical signal transmission lines of a given communications network.

A network element (e.g., router 108a) receives and transmits data (e.g., hardware frames) to and from one or more communications networks via a line interface module and an associated line interface of a line cards 202a. In an ingress or "data-receiving" direction, data which is received via a line interface 204a on a line interface module 206a of a line card 202a is processed into one or more packets. The packets are then transmitted from the line card's line interface module 206a to its ingress packet processing module 208a which receives a packet and stores its associated packet data within one or more storage elements or "memory data units" (MDUs) within an associated memory 214a.

The stored packet data is then processed by the ingress packet processing module 208a to determine whether the packet should be accepted, dropped, or transmitted to another line card 202b–d via the line card interconnect 200 for eventual transmission out of the network element. If the packet is to be transmitted to another one of the line cards 202b–d via the line card interconnect 200, the packet's data is passed from the ingress packet processing module 208a to the line card interconnect interface module 212a and then across the line card interconnect 200 to the line card interconnect interface module of one or more destination line cards 202b–d.

In the egress or "data-transmitting" direction, data is received at a line card interconnect interface module 212b–d of a destination line card 202b–d and is then transmitted to the line card's egress packet processing module 210b–d. At the egress packet processing module 210b–d the packet data is stored within one or more storage elements within an associated memory 216b–d, processed, and then transmitted to an associated line interface module 206b–d where it is transmitted out of the network element in a suitable data format via one or more of the line interface module's line interfaces 204b–d.

In alternative embodiments of the present invention, packet data may be replicated in an ingress direction by an ingress packet processing module 208a–d and/or by a line card interconnect interface module 212a–d, and in an egress direction by an egress packet processing module 210a–d. Such replication may occur for any of a variety of reasons, for example, a packet received via a line interface of line card 202a may be designated for "multicast" and accordingly need to be transmitted out of the network element via multiple line cards. Packet data associated with the packet may then be replicated by ingress packet processing module 208a and/or line card interconnect 212a and transmitted to two or more of line cards 202b–d.

Similarly, a packet received via a line card interconnect interface module 212c of a line card 202c may be designated for "multicast" and accordingly need to be transmitted out of the network element via multiple line interfaces 204c. Packet data associated with the packet may then be replicated by egress packet processing module 210c and subsequently transmitted by line interface module 206c via the appropriate line interfaces 204c. Multiple line card and multiple line interface or "port" multicasting may also occur, simultaneously, causing packet data associated with a packet to be replicated in multiple stages and/or locations within a network element. Moreover, packets and packet data may be replicated for alternative reasons such as to allow packet snooping, broadcast packet transmission, etc.

While a specific number of line cards having specific components have been illustrated by way of example in the figure, it is to be appreciated that embodiments of the present invention are not so limited. For example, alternative embodiments of the present invention may include network elements having a greater or lesser number of line cards, one or more line cards having a greater or lesser number of components, or one or more line cards having a different arrangement or configuration of the same components than that of the network element embodiment illustrated in FIG. 2.

Similarly, a network element in one embodiment could be limited to a single line card with the capability to receive and transmit communication signals (e.g., TDM traffic, which may include packet traffic) within a communications network (e.g., communications network 100), employing one or more interfaces for the receipt and transmission of such communication signals. In another embodiment, a network element may include a first line card to receive communication signals from another network element, and a second line card to transmit communication signals to the other network element or another network element within communications network. In one such embodiment, a third line card could be incorporated into this given network element to add, drop and transmit different types of communication signals including different types of packet traffic, such as ATM, Frame Relay, IP, etc., received from and transmitted to other network elements.

A given network element may similarly include a single line card with multiple interfaces such that a first interface receives TDM traffic from another network element, a second interface transmits TDM traffic to another network element, and a third interface adds, drops and transmits traffic, such as packet traffic, to another network element. Moreover, network elements of other embodiments of the present invention may include a single packet processing module rather than an independent ingress packet processing module 208a–d and egress packet processing module 210a–d and/or separate ingress and egress packet processing modules having a single, shared memory module coupled to each rather than independent memory modules 214a–d and 216a–d. Still other embodiments of the present invention may include one or more TDM control modules (not illustrated) coupled between the line interface modules 206a–d of each of the line cards 202a–d, respectively, for the reception and transmission of TDM traffic into and out of the network element.

TDM traffic received by TDM control modules (not illustrated) from line interface modules 206a–d could then be switched to any of the other line interface modules 206a–d, based on configuration data for the timeslots of the TDM traffic. For example, TDM control modules could be configured such that data within the first ten timeslots of a TDM signal, such as a SONET/SDH signal, received on a first interface of line interface module 206a are forwarded out the first five timeslots of a TDM signal being transmitted out from a first interface of line interface module 206d.

Figure 3:
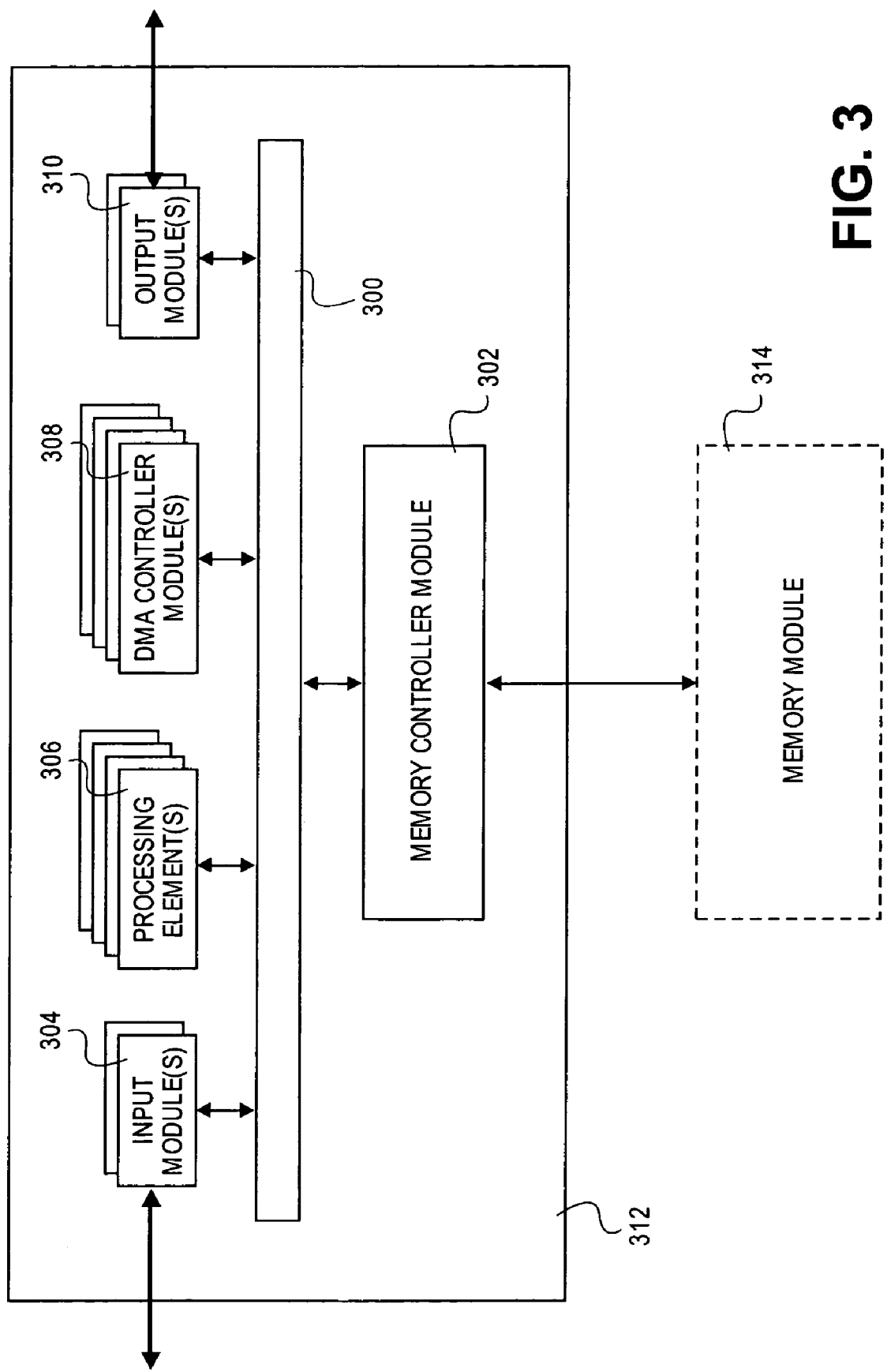
FIG. 3 illustrates a block diagram of a portion of a packet processing module according to one embodiment of the present invention.

FIG. 3 illustrates a block diagram of a portion of a packet processing module according to one embodiment of the present invention. In one embodiment, the illustrated packet processing module 312 may comprise any of the packet processing modules 208a–d and/or 210a–d of FIG. 2. In the illustrated embodiment, packet processing module 312 includes one or more input modules 304, one or more processing elements 306, one or more direct memory access (DMA) controller modules 308, one or more output modules 310, and a memory controller module 302, all coupled together via a shared interconnection network 300. Memory controller module 302 of the illustrated embodiment may additionally be coupled to one or more memory modules 314 (e.g., memory modules 214a–d and/or 216a–d of FIG. 2).

In one embodiment of the present invention, input module(s) 304 receive a packet including packet data, allocate a storage element for the packet, store the packet data within the storage element, and initialize a transmit count value of the storage element corresponding to the number of times the storage element has been transmitted via an output interface (e.g., output module 310 or a line interface module 206a–d, and/or a line card interconnect interface module 212a–d of FIG. 2). Furthermore, in the described embodiment, processing elements 306 determine a release count value of the storage element, corresponding to the number of times the storage element must be replicated or transmitted via an output interface prior to being de-allocated; DMA controller module(s) 308 transmit the packet data from the storage element; and memory controller module 302 increments the transmit count value by one in response to a transmission of the packet data and de-allocates the storage element in response to a determination that the incremented transmit count value is equal to the release count value.

Figure 4:
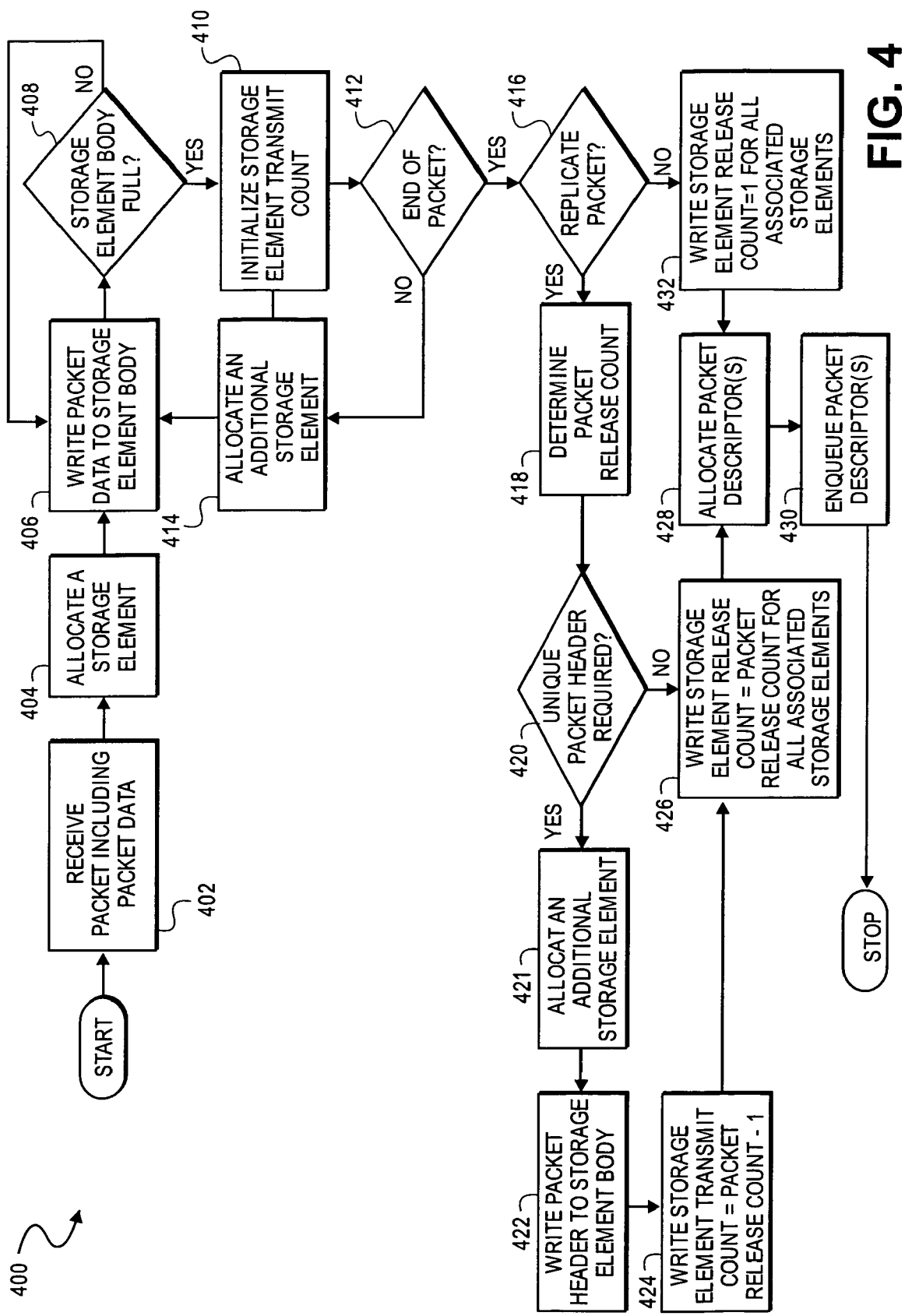
FIG. 4 illustrates a flowchart of a packet reception process according to one embodiment of the invention.

FIG. 4 illustrates a flowchart of a packet reception process according to one embodiment of the invention. The illustrated process 400 begins with the receipt of a packet including packet data at process block 402. Thereafter a storage element or memory data unit (MDU) is allocated at process block 404 and the packet data is written to the storage element's body at process block 406. A determination is then made whether the storage element's body is full at process block 408. In an alternative embodiment, a predetermined capacity threshold is established and a determination is made whether the predetermined capacity threshold has been reached rather than whether the body of the storage element is full. If the storage element's body is determined to be full in the previously described embodiment, a transmit count value of the storage element, stored within the storage element's header is initialized as illustrated at process block 410. Otherwise, packet data is written into the storage element's body until a determination is made that it is full. In one embodiment the transmit count value is initialized by setting it equal to zero to indicate that the associated storage element or MDU has been transmitted zero times.

Once the transmit count value of the storage element has been initialized, a determination is made whether the end of the packet has been reached at process block 412. If the end of the packet has not been reached, an additional storage element is allocated to store the remaining packet data at process block 414 and the illustrated process returns to the state illustrated at process block 406 in which packet data is stored or written into the newly allocated additional storage element associated with the packet. Once the end of the packet has been reached and all of the packet data of the packet is stored within one or more associated storage elements or MDUs, a determination is made whether or not the packet is to be replicated at process block 416.

In alternative embodiments of the present invention, the determination whether or not the packet is to be replicated may be made by performing a forwarding information base (FIB) lookup, an access control list (ACL) lookup, and/or a classless inter-domain routing (CIDR) lookup. If it is determined that the current packet is not to be replicated, a release count value of each storage element associated with the current packet is set equal to one. This may occur, for example if the packet is not set to be "snooped" and is a unicast packet (i.e., not a broadcast or multicast) or is a multicast packet to be transmitted to a single destination (e.g., a single line card or single output port on a given line card).

If it is determined that the current packet is to be replicated, the packet's release count, corresponding to the number of times the packet must be replicated or transmitted via an output interface, is determined at process block 418. In some embodiments of the present invention, the determination of whether a packet is to be replicated illustrated by process block 416 and its release count (process block 418) are simultaneously determined in a single step. Thereafter, it is determined whether a unique packet header is required for one or more of the replicated copies of the packet at process block 420.

A unique packet header may be required for example, when a packet will be transmitted from the network element via multiple output interfaces, "contexts" or "ports". In such an embodiment, a separate queue may be maintained for each output port necessitating a unique packet header for each queue. However, the use of unique packet headers with embodiments of the present invention should not be limited to such situations. If a unique packet header is determined to be required, an additional storage element or MDU is allocated at process block 421. The packet's header is then stored or written into the newly allocated additional storage element associated with the packet at process block 422.

Next, a transmit count value of the newly allocated additional storage element associated with the packet is initialized at process block 424 by setting it equal to one less than the packet release count determined at process block 418. Thereafter, or if a determination at process block 420 is made that a unique packet header is not required, a release count value of each storage element associated with the current packet is set equal to the previously determined packet release count at process block 426. In one embodiment of the present invention, storage elements associated with a particular packet are stored as elements within a linked list. As each additional storage element is allocated it is associated or "linked" with the remaining storage elements of its list. For example, as each additional storage element is allocated as the illustrated process 400 reaches the state illustrated by process block 414, it is linked with an immediately preceding storage element.

Once the release count value of each storage element associated with the current packet is set at either process block 426 or 432 a packet descriptor is allocated for the packet at process block 428. The packet descriptor identifies the storage elements containing the packet data of the packet and in one embodiment may be utilized in the scheduling of packet transmission. Thereafter, the packet descriptor may be enqueued or stored at process block 430 and the illustrated process terminates. In alternative embodiments of the present invention a packet descriptor as allocated at process block 428 may contain additional data such as the total number of storage elements used to store the packet, the total number of bytes of packet data within the packet, packet time-to-live (TTL), transmission instructions, etc.

In one embodiment, the packet descriptor includes a release count value corresponding to the number of times each of the storage elements associated with the packet must be replicated or transmitted via an output interface prior to being de-allocated. Consequently, a single release count value associated with the packet descriptor may be set and utilized each time a storage element of the packet is transmitted rather than setting the release count value of each individual storage element associated with the packet as described with respect to the illustrated embodiment at process blocks 426 and 432. In another embodiment in which the storage elements of a packet are stored within a linked list data structure, the packet descriptor may additionally include a pointer or reference to the first storage element in the linked list.

In one embodiment, the operations of the above-described process 400 associated with process blocks 402–414 are performed utilizing an input module of a line card packet processing module (e.g., input module 304 of FIG. 3) and the operations of the above-described process 400 associated with process blocks 416–430 are performed utilizing a processing element of a line card packet processing module (e.g. one or more of processing element(s) 306 of FIG. 3).

Figure 5:
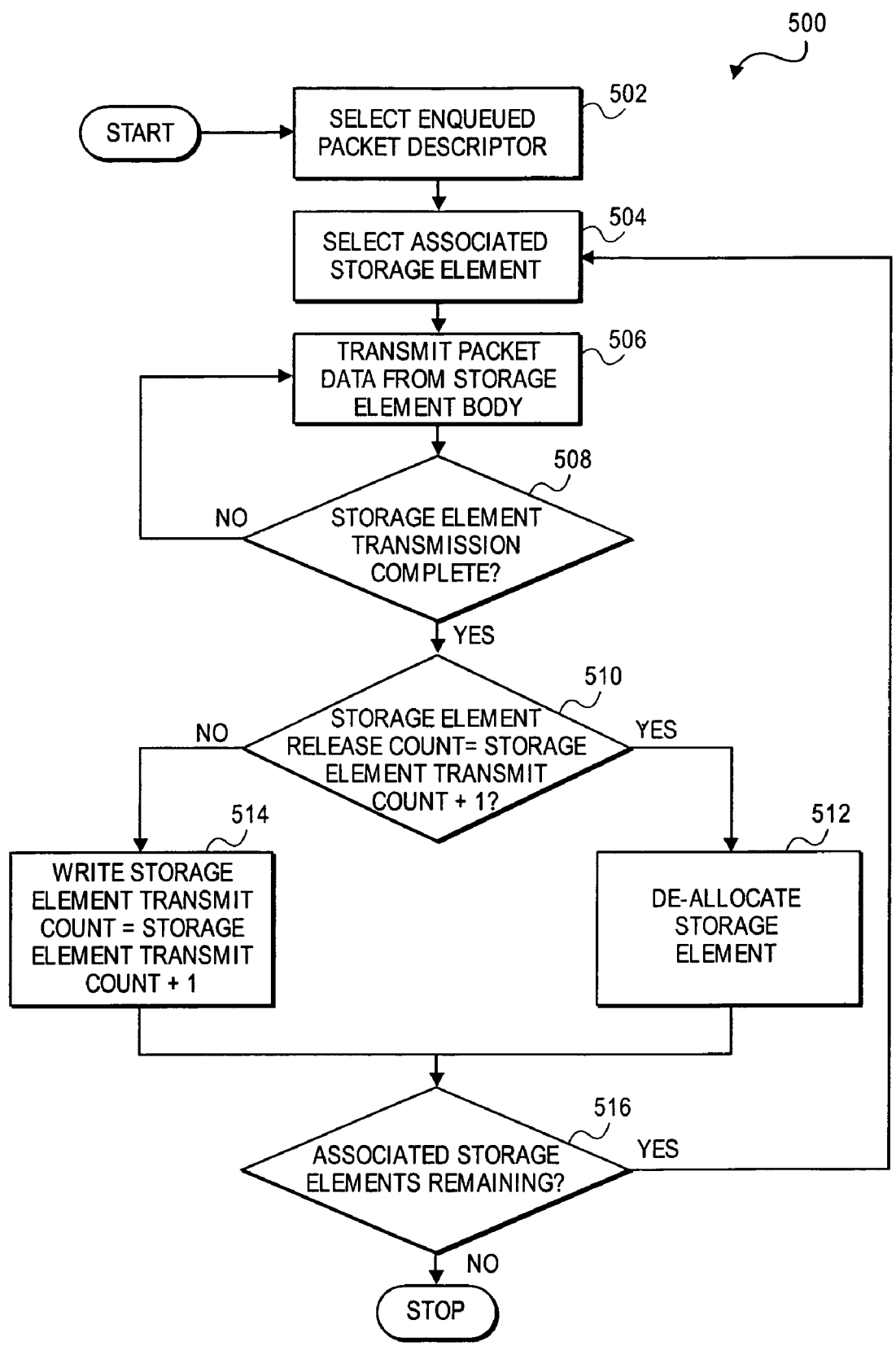
FIG. 5 illustrates a flowchart of a packet transmission process according to one embodiment of the invention.

FIG. 5 illustrates a flowchart of a packet transmission process according to one embodiment of the invention. The illustrated process 500 begins as an enqueued packet descriptor (e.g., the packet descriptor enqueued at process block 430 of FIG. 4) associated with a packet is selected at process block 502. The selected packet descriptor is then utilized to select a storage element containing packet data of the packet at process block 504. Next, packet data of the selected storage element is transmitted as illustrated by process block 506 and a determination is then made whether the storage element's packet data transmission is complete at process block 508.

If the storage element transmission is not complete, transmission of the storage element's packet data continues. Otherwise, a determination is made whether the transmit count value is one less than the release count value of the current storage element at process block 510. In one embodiment, the determination whether the transmit count value is one less than the release count value indicates whether the current storage element has been transmitted a required number of times. Consequently, if the current storage element's transmit count value is not one less than the release count value, the transmit count value of the storage element is incremented by one at process block 514 indicating the storage element has been transmitted again. If the current storage element's transmit count value is one less than the release count value, then the storage element has been transmitted the required number of times and it may then be de-allocated at process block 512.

In an alternative embodiment, the transmit count value of a storage element is atomically incremented by one following transmission to indicate that the storage element has been transmitted again and then a determination is made whether the atomically incremented transmit count value is equal to the release count value. In yet another alternative embodiment, a determination may be made whether the incremented transmit count value is equal to or greater than the release count value. Such embodiments ensure that the correct transmit count is available and prevent errors caused by the improper de-allocation or use of storage elements by multiple modules (e.g., DMA controller modules 308 or memory controller module 302 of FIG. 3).

Once the storage element has either been de-allocated or had its transmit count value increased to indicate the current transmission in the illustrated embodiment, a determination is made whether there are any remaining storage elements associated with the current packet. If so, the process returns to the state indicated by process block 504 in which one of the storage elements associated with the current packet is selected and the illustrated process 500 continues. Otherwise if no storage elements associated with the current packet remain, the illustrated process 500 terminates.

In one embodiment, a direct memory access controller module such as one of the DMA controller module(s) 308 of FIG. 3 is utilized to select the enqueued packet descriptor and the associated storage element as described with respect to process blocks 502 and 504 above. In such an embodiment, the DMA controller module retrieves a storage element and its associated packet data from a memory module (e.g., one of memory module(s) 214a–d and/or 216a–d of FIG. 2) utilizing a memory controller module such as memory controller module 302 of FIG. 3. The DMA controller module then transmits the packet data as described with respect to process blocks 506 and 508 above from the storage element via one or more output interfaces.

Accordingly, a storage element of a non-replicated packet (having a value of one for a release count value) or a unique, packet-header-containing storage element of a replicated packet (having a transmit count value set initially equal to one less than its associated packet's, and consequently its own, release count value) will be de-allocated after a single transmission whereas other storage elements of a replicated packet will be de-allocated after an appropriate number of transmissions.

In one embodiment, the DMA controller module retrieves the storage element by issuing a request including the storage element's release count value to the memory controller module. As the request for the storage element is received by the memory controller module, the memory controller module retrieves the transmit count value of the storage element from the storage element's header, performs the comparison illustrated by process block 510, and then either de-allocates the storage element or increments its transmit count value as described with respect to process blocks 512 and 514 above, respectively.

Figure 6:
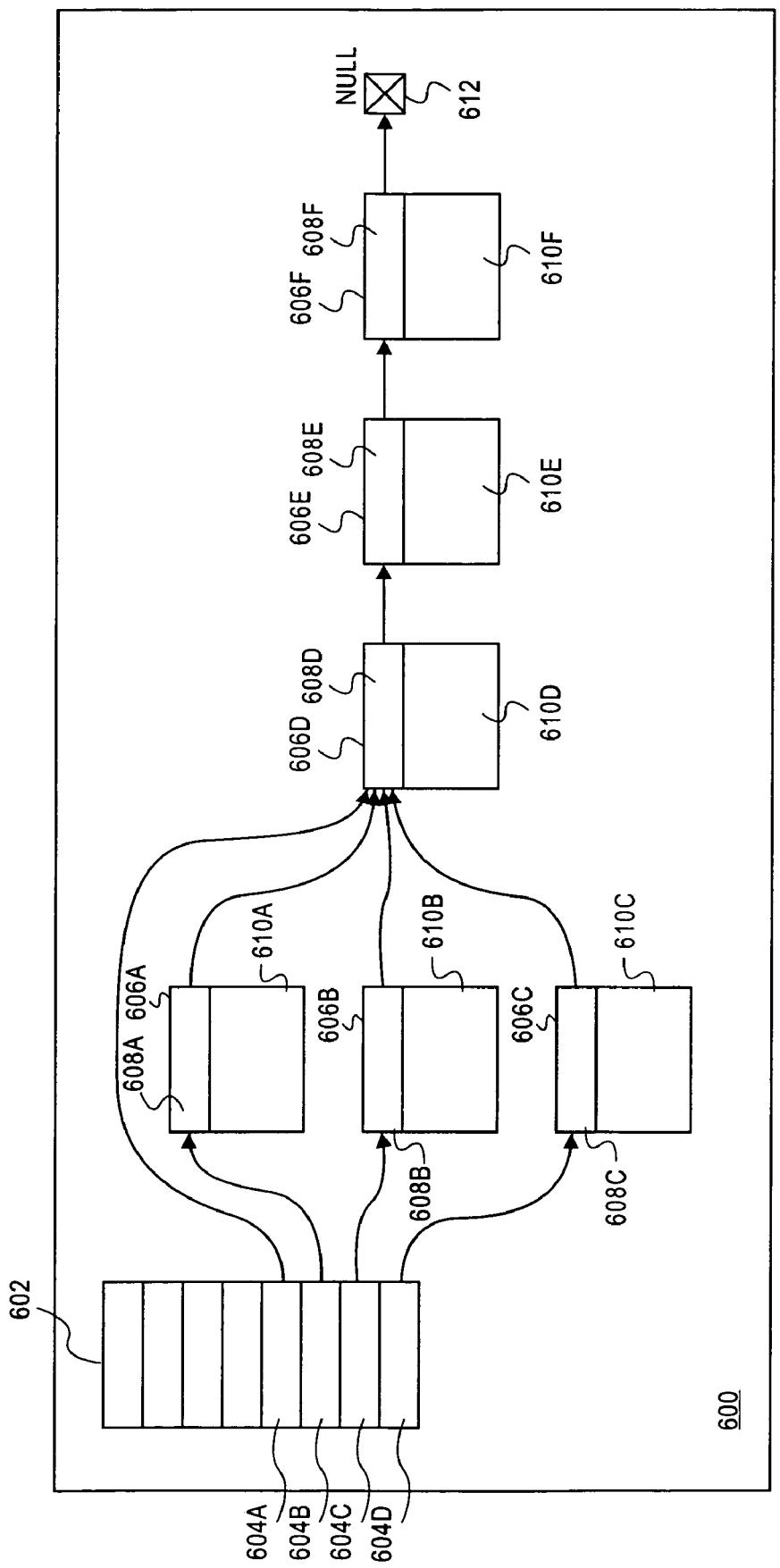
FIG. 6 illustrates a replicated packet storage element chain according to one embodiment of the invention.

FIG. 6 illustrates a replicated packet storage element chain according to one embodiment of the invention. In the illustrated embodiment, a packet descriptor queue 602 and a plurality of storage elements (606a–f) or MDUs each including a header 608a–f and a body 610a–f are shown within a memory space 600 of an associated memory module. In one embodiment, each storage element comprises 256 of storage capacity segmented into a 32-byte header and a 224-byte body. Storage elements 606a–f include a plurality of unique storage elements 606a–c and a plurality of common storage elements 606d–f. While a particular number of unique storage elements 606a–c and common storage elements 606d–f have been shown for illustrative purposes, alternative embodiments of the present invention are contemplated in which any number of unique and common storage elements may be utilized.

Each unique storage element 606a–c includes a copy of a packet header of an associated packet within its body 610a–c and each common storage element 606d–f includes a portion of the associated packet's body or "payload" within its body 610d–f. In the illustrated embodiment, common storage elements 606d–f are stored within a linked list data structure in memory space 600 and packet descriptor queue 602 includes a plurality of packet descriptors 604a–d each of which includes a reference or pointer to one of storage elements 606a–f.

In one embodiment, packet descriptors 604b–d each include a reference or pointer to a unique storage element 606a–c and each unique storage element 606a–c in turn includes a reference to the first common storage element 606d of the linked list of common storage elements 606d–f within its corresponding header 608a–c. In another embodiment, a packet descriptor 604a may alternatively or additionally include a direct reference or pointer to the first common storage element 606d of the linked list of common storage elements 606d–f. In the illustrated embodiment, the last common storage element 606f of the linked list data structure includes a null pointer value within its header 610f to indicate that it is the last storage element for its packet.

Figure 7:
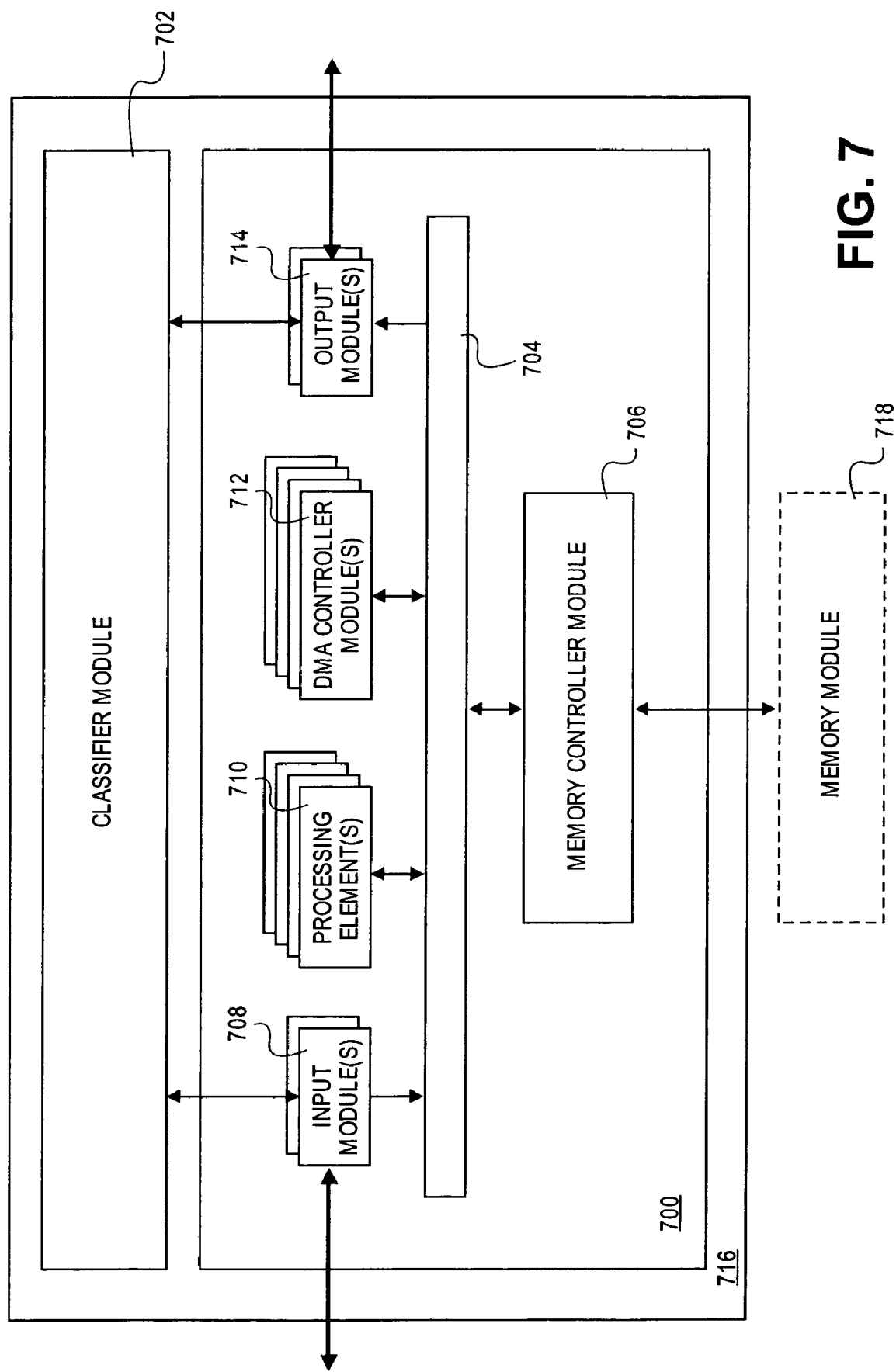
FIG. 7 illustrates a block diagram of a portion of a packet processing module according to an alternative embodiment of the present invention.

FIG. 7 illustrates a block diagram of a portion of a packet processing module according to an alternative embodiment of the present invention. As described with respect to FIG. 3, the illustrated packet processing module 716 may in one embodiment comprise any of the packet processing modules 208a–d and/or 210a–d of FIG. 2. In contrast to the embodiment described with respect to FIG. 3 however, the packet processing module 716 of the illustrated embodiment includes a separate classifier module 702 and traffic manager module 700.

In one embodiment, classifier module 702 is used to classify packets that arrive at its input and provide the results of the classification at its output which may include modifying or "grooming" packets to support a base level of packet forwarding, freeing traffic manager module 700 to perform more processing-intensive, value-added services. In another embodiment, the classifier module 702 is utilized to perform regular lookups that can be easily predicted and are memory access intensive, and/or can be reduced to simply configurable hardware. In another embodiment, the classifier module 702 receives a stream of packet headers, and for each header, it extracts fields, creates keys, performs lookups on keys, collects decision information, and provides an output stream which may comprise packet identifier, output, encapsulation/decapsulation, and other data.

Traffic manager module 700 in one embodiment provides packet storage or "buffering", queuing, and processing. Traffic manager module 700 of the illustrated embodiment includes one or more input modules 708, one or more processing elements 710, one or more direct memory access (DMA) controller modules 712, one or more output modules 714, and a memory controller module 706, all coupled together via a shared interconnection network 704 as shown. Memory controller module 706 of the illustrated embodiment may additionally be coupled to one or more memory modules 718 (e.g., memory modules 214a–d and/or 216a–d) of FIG. 2.

In one embodiment of the present invention, input module (s) 708 receive a packet including packet data, associate a packet identifier (ID) with the received packet, provide packet header data of the received packet's packet data to classifier module 702, and store packet body data of the received packet's packet data within traffic manager module 700. Thereafter, in the described embodiment, classifier module 702 determines whether the received packet is to be replicated or not utilizing the received packet header data. If it is determined that the received packet is to be replicated, classifier module 702 modifies the received packet header data appropriately and provides the modified packet header data and the received packet's packet ID back to the traffic manager. The traffic manager 700 may then associate the modified packet header data with the received packet's packet body data utilizing the received packet ID.

Figure 8:
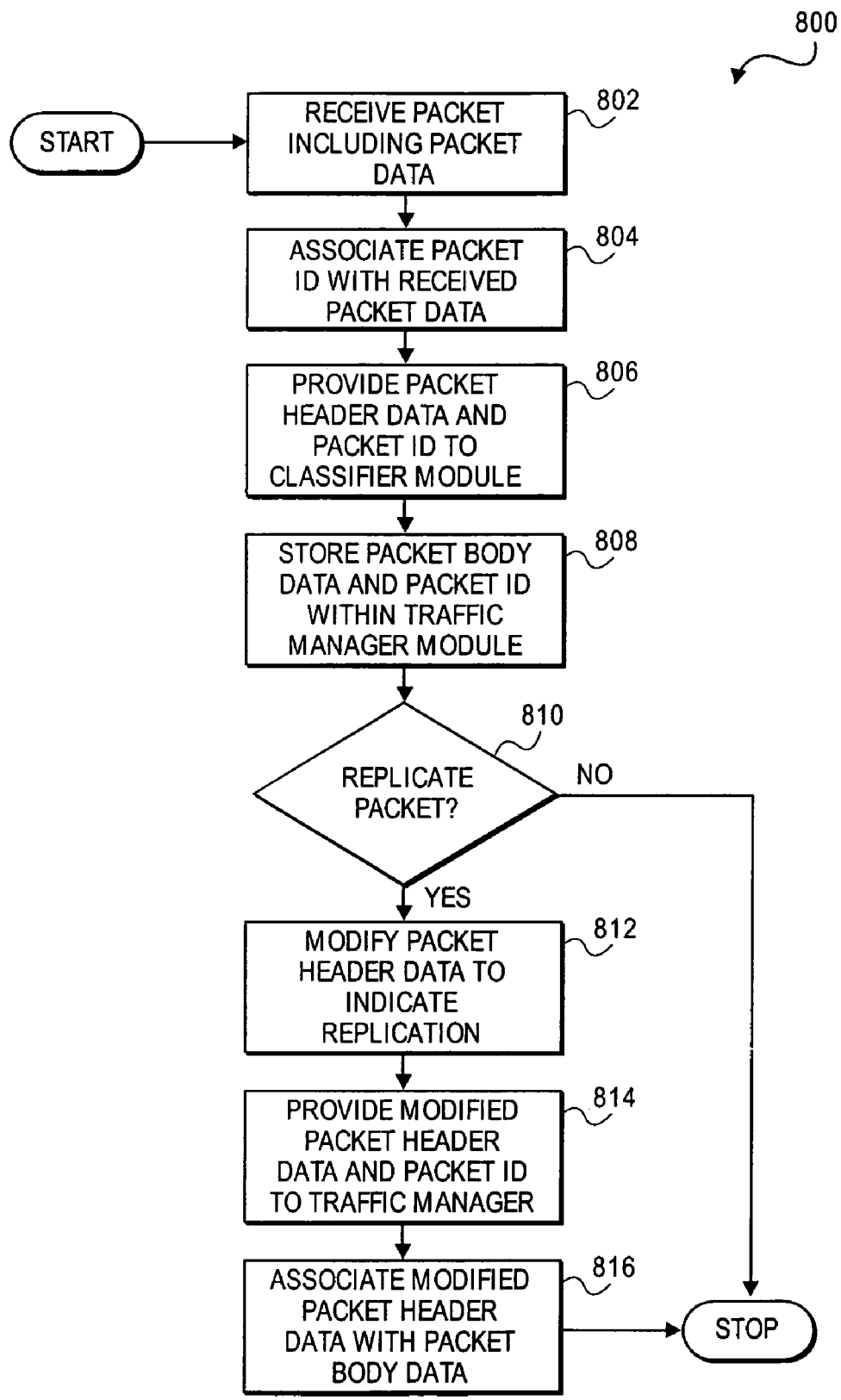
FIG. 8 illustrates a flowchart of a cross-chip replication process according to one embodiment of the invention.

FIG. 8 illustrates a flowchart of a cross-chip replication process according to one embodiment of the invention. The illustrated process 800 begins with the receipt of a packet including packet data at process block 802. Thereafter a packet ID is associated with the received packet at process block 804. Next, the packet ID as well as packet header data of the received packet's packet data is provided to a classifier module at process block 806 and packet body data of the received packet's packet data is stored within a traffic manager module at process block 808. A determination is then made whether the received packet is to be replicated or not at process block 810. In one embodiment this determination is made utilizing packet header data of the received packet's packet data.

If the received packet is not to be replicated the illustrated process 800 terminates. Otherwise, the packet header data of the received packet's packet data is modified to indicate the desired replication at process block 812 and the received packet's modified packet header data and packet ID are provided to the traffic manager at process block 814. Once received by the traffic manager, the modified packet header data is associated with packet body data at process block 816. In one embodiment of the present invention this is accomplished utilizing the provided packet ID. Thereafter the illustrated process terminates.

Various embodiments (e.g., line cards, network elements, etc.) of the present invention include memory modules, processing elements, and/or Application Specific Integrated Circuits (ASICs). Such memory modules comprise a machine-readable medium on which may be stored a set of instructions (i.e., software) embodying any one, or all, of the processes or methodologies described herein. Such instructions may reside, completely or partially, within an illustrated memory module, processing element, and/or ASIC.

For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Thus, a method and apparatus for replicating packet data within a network element have been described. In the foregoing description, the present invention has been described with reference to specific exemplary embodiments thereof. It will be apparent however, that variations or modifications of the exemplary embodiments described as well as alternative embodiments of the present invention may be implemented without departing from the broader spirit or scope of the present invention as defined in the appended claims. For example, the order in which the operations of the various process embodiments of the present invention may be varied and/or re-ordered, and operations themselves may be expanded or combined to produce a greater or lesser number of operations within the scope of the present invention. The specification and drawings are accordingly to be regarded in an illustrative rather than a restrictive sense.

What is claimed is:

1. A method comprising:
   storing packet data including a packet header and a packet body within a storage element, wherein storing packet data includes:
      storing said packet body within a common storage element;
      storing a copy of said packet header within a unique storage element for each of a plurality of output interfaces; and
      associating each of said plurality of unique storage elements with said common storage element;
   transmitting said packet data from said storage element via said plurality of output interfaces;
   maintaining a transmit count value of said storage element, wherein maintaining a transmit count value includes:
      initializing said transmit count value by setting said transmit count value of each of said plurality of unique storage elements equal to one less than a release count value; and
      incrementing said transmit count value by one in response to transmitting;
   determining said release count value of said storage element;
   comparing said transmit count value and said release count value; and
   de-allocating said storage element in response to comparing said transmit count value and said release count value.

2. The method of claim 1, further comprising:
   receiving a packet including said packet data; and
   allocating said storage element in response to receiving said packet.

3. The method of claim 1, wherein comparing said transmit count value and said release count value comprises determining whether said incremented transmit count value is equal to said release count value, and de-allocating said storage element in response to comparing said transmit count value and said release count value comprises de-allocating said storage element in response to a determination that said incremented transmit count value is equal to said release count value.

4. The method of claim 1, wherein transmitting said packet data from said storage element via said plurality of output interfaces comprises transmitting said packet data from said storage element via a plurality of line interfaces.

5. The method of claim 4, wherein transmitting said packet data from said storage element via said plurality of line interfaces comprises transmitting said packet data from said storage element via a line interface selected from the group consisting of: an Ethernet interface, a Fast Ethernet interface, a Gigabit Ethernet interface, an OC-48/STM-16 interface, an OC-12/STM-14 interface, an OC-3/STM-1 interface, an IF Video interface, a DWDM interface, a DS-1 interface, a DS-3 interface, an E-1 interface, and an E-3 interface.

6. A machine-readable medium that provides instructions, which when executed by a set of one or more processors, cause said set of processors to perform operations comprising:
   storing packet data including a packet header and a packet body within a storage element, wherein storing packet data within a storage element includes:
      storing said packet body within a common storage element;
      storing a copy of said packet header within a unique storage element for each of a plurality of output interfaces; and
      associating each of said plurality of unique storage elements with said common storage element;
   transmitting said packet data from said storage element, wherein transmitting said packet data from said storage element includes:
      transmitting said packet data from said storage element via said plurality of output interfaces;
   maintaining a transmit count value of said storage element, wherein maintaining a transmit count value of said storage element includes:
      initializing said transmit count value by setting said transmit count value of each of said plurality of unique storage elements equal to one less than a release count value; and
      incrementing said transmit count value by one in response to transmitting said packet data;
   determining said release count value of said storage element;
   comparing said transmit count value and said release count value; and
   de-allocating said storage element in response to comparing said transmit count value and said release count value.

7. The machine-readable medium of claim 6, said operations further comprising:

receiving a packet including said packet data; and allocating said storage element in response to receiving said packet.

8. The machine-readable medium of claim 6, wherein comparing said transmit count value and said release count value comprises determining whether said incremented transmit count value is equal to said release count value, and de-allocating said storage element in response to comparing said transmit count value and said release count value comprises de-allocating said storage element in response to a determination that said incremented transmit count value is equal to said release count value.

9. The machine-readable medium of claim 6, wherein transmitting said packet data from said storage element via said plurality of output interfaces comprises transmitting said packet data from said storage element via a plurality of line interfaces.

10. The machine-readable medium of claim 9, wherein transmitting said packet data from said storage element via said plurality of line interfaces comprises transmitting said packet data from said storage element via a line interface selected from the group consisting of: an Ethernet interface, a Fast Ethernet interface, a Gigabit Ethernet interface, an OC-48/STM-16 interface, an OC-12/STM-14 interface, an OC-3/STM-1 interface, an IF Video interface, a DWDM interface, a DS-1 interface, a DS-3 interface, an E-1 interface, and an E-3 Interface.

11. A method comprising:

storing a plurality of packet data within a plurality of storage elements, each one of said plurality of packet data including a packet header and a packet body, wherein storing said plurality of packet data within a storage element comprises:

storing said packet body within a common storage element;

storing a copy of said packet header within a unique storage element for each of a plurality of output interfaces; and associating each of said plurality of unique storage elements with said common storage element;

transmitting each one of said plurality of packet data from said plurality of storage elements, wherein transmitting each one of said plurality of packet data from said plurality of storage elements comprises transmitting each one of said plurality of packet data from one of said plurality of storage elements via said plurality of output interfaces;

maintaining a transmit count value of each one of said plurality of storage elements stored within each one of said plurality of storage elements storing a plurality of packet data, wherein maintaining said transmit count value of said plurality of storage element comprises:

initializing said transmit count value, wherein initializing said transmit count value comprises setting said transmit count value of each of said plurality of unique storage elements equal to one less than a release count value; and incrementing said transmit count value by one in response to transmitting one of said plurality of packet data;

determining said release count value of each one of said plurality of storage elements;

comparing said transmit count value and said release count value for each one of said plurality of storage elements; and de-allocating each one of said plurality of storage elements in response to comparing said transmit count value and said release count value.

* * * * *